(12) United States Patent
Lv (10) Patent No.: US 9,799,335 B2
(45) Date of Patent: Oct. 24, 2017

(54) METHOD AND DEVICE FOR SPEECH RECOGNITION (71) Applicants: BOE TECHNOLOGY GROUP CO., LTD., Beijing (CN); BEIJING BOE MULTIMEDIA TECHNOLOGY CO., LTD., Beijing (CN)

(72) Inventor: Bendeng Lv, Beijing (CN)

(73) Assignees: BOE TECHNOLOGY GROUP CO., LTD., Beijing (CN); BEIJING BOE MULTIMEDIA TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/122,392

(22) PCT Filed: Aug. 12, 2015

(86) PCT No.: PCT/CN2015/086765
§ 371 (c)(1),
(2) Date: Aug. 29, 2016

(87) PCT Pub. No.: WO2016/173144
PCT Pub. Date: Nov. 3, 2016

(65) Prior Publication Data
US 2017/0069320 A1    Mar. 9, 2017

(30) Foreign Application Priority Data

Apr. 30, 2015  (CN) .......................... 2015 1 0219286

(51) Int. Cl.
*G10L 15/00* (2013.01)
*G10L 15/22* (2006.01)
(Continued)

(52) U.S. Cl.
CPC .............. *G10L 15/22* (2013.01); *G10L 25/51* (2013.01); *G10L 15/02* (2013.01); *G10L 17/02* (2013.01);
(Continued)

(58) Field of Classification Search
CPC ......... G10L 15/22; G10L 25/51; G10L 17/02; G10L 15/02; G10L 2015/223; G10L 17/06
(Continued)

(56) References Cited

U.S. PATENT DOCUMENTS

2001/0056349 A1* 12/2001 St. John ............. G07C 9/00158
704/270
2008/0103781 A1    5/2008 Wasson et al.

FOREIGN PATENT DOCUMENTS

CN    101071564 A    11/2007
CN    102262879 A    11/2011
(Continued)

OTHER PUBLICATIONS

Office Action in Chinese Application No. 201510219286.7 dated Nov. 29, 2016, with English translation. 4 pages.
(Continued)

*Primary Examiner* — Thierry L Pham
(74) *Attorney, Agent, or Firm* — Blakely Sokoloff Taylor & Zafman LLP (57) ABSTRACT

Embodiments of the present disclosure provide a method and device for speech recognition. The solution comprises: receiving a first speech signal issued by a user; performing analog to digital conversion on the first speech signal to generate a first digital signal after the analog to digital conversion; extracting a first speech parameter from the first digital signal, the first speech parameter describing a speech feature of the first speech signal; if the first speech parameter
(Continued)

coincides with a first prestored speech parameter in a sample library, executing control signalling instructed by the first digital signal, the sample library prestoring prestored speech parameters of N users, N≥1. The solution can be applied in a speech recognition process and can improve the accuracy of speech recognition.

15 Claims, 5 Drawing Sheets

(51) Int. Cl.
*G10L 25/51* (2013.01)
*G10L 17/00* (2013.01)
*G10L 15/02* (2006.01)
*G10L 17/06* (2013.01)
*G10L 17/02* (2013.01)

(52) U.S. Cl.
CPC ........ *G10L 17/06* (2013.01); *G10L 2015/223* (2013.01)

(58) Field of Classification Search
USPC ........ 704/231, 239, 246, 247, 251, 270, 275
See application file for complete search history.

(56) References Cited

FOREIGN PATENT DOCUMENTS

| | | |
|---|---|---|
| CN | 102708867 A | 10/2012 |
| CN | 103594088 A | 2/2014 |
| CN | 103778915 A | 5/2014 |
| CN | 104104790 A | 10/2014 |
| CN | 104347075 A | 2/2015 |
| CN | 104464720 A | 3/2015 |
| CN | 104575504 A | 4/2015 |
| CN | 104821168 A | 8/2015 |
| JP | 2003015682 A | 1/2003 |
| WO | WO 2014088845 A1 | 6/2014 |

OTHER PUBLICATIONS

International Search Report in PCT/CN2015/086765 dated Jan. 20, 2016, with English translation. 16 pages.

Office Action in Chinese Application No. 201510219286.7 dated Aug. 25, 2016, with English translation. 10 pages.

* cited by examiner

METHOD AND DEVICE FOR SPEECH RECOGNITION

RELATED APPLICATION

The present application is the U.S. national phase entry of PCT/CN2015/086765, with an international filling date of Aug. 12, 2015, which claims the benefit to Chinese Patent Application No. 201510219286.7, filed on Apr. 30, 2015, the entire disclosures of which are incorporated herein by reference.

TECHNICAL FIELD

The present disclosure relates to the field of electronic technologies, and particularly to a method and device for speech recognition.

BACKGROUND

Speech recognition technology is a technology that enables a machine to convert a speech signal into a corresponding text or command by means of recognition and understanding. For example, after receiving the user's speech instruction, a mobile phone that possesses speech recognition function performs analog to digital conversion of the speech instruction to obtain a corresponding digital signal, and further recognizes the content of the speech instruction based on the converted digital signal. For instance, the content of the speech instruction is "unlock", so the mobile phone generates control signalling for unlocking based on the content of the speech instruction so as to perform unlocking operation of the mobile phone.

However, during the above speech recognition process, only the content of the received speech instruction can be recognized while the subject issuing the speech instruction cannot be determined, which would decrease the accuracy of speech recognition and even lead to unnecessary risks of misoperation. For example, any user can unlock the mobile phone by applying a speech signal of "unlock" instruction, causing hidden trouble in security of the user's information.

SUMMARY

It is an object of the present disclosure to provide an enhanced method and device for speech recognition which overcome or alleviate the above deficiencies or problems related to the speech recognition technology.

To this end, embodiments of the present disclosure employ the following technical solution.

In accordance with a first aspect, embodiments of the present disclosure provide a method for speech recognition comprising:

receiving a first speech signal issued by a user;

performing analog to digital conversion of the first speech signal to generate a first digital signal after the analog to digital conversion;

extracting a first speech parameter from the first digital signal, the first speech parameter describing a speech feature of the first speech signal;

if the first speech parameter coincides with a first prestored speech parameter in a sample library, executing control signalling instructed by the first digital signal, the sample library prestoring prestored speech parameters of N users, N≥1.

In an embodiment, after extracting the first speech parameter from the first digital signal, the method further comprises:

if the first speech parameter does not coincide with any of the prestored speech parameters of the N users in the sample library, identifying the first speech signal as a stranger speech.

In another embodiment, if the first speech parameter coincides with the first prestored speech parameter in the sample library, executing control signalling instructed by the first digital signal comprises:

if a similarity between the first speech parameter and the first prestored speech parameter is greater than a threshold, determining that the user who issues the first speech signal is a first user corresponding to the first prestored speech parameter; and if the first user has speech permission, executing control signalling instructed by the first digital signal.

In a further embodiment, extracting the first speech parameter from the first digital signal comprises:

performing signal filtering on the first digital signal so as to obtain at least a first sub signal and a second sub signal from the filtered first digital signal;

extracting, from the first sub signal, a second speech parameter that describes a speech feature of the first sub signal, and extracting, from the second sub signal, a third speech parameter that describes a speech feature of the second sub signal.

In yet another embodiment, if the first speech parameter coincides with the first prestored speech parameter in the sample library, executing control signalling instructed by the first digital signal comprises:

determining whether the sample library comprises a second prestored speech parameter that coincides with the second speech parameter, and/or a third prestored speech parameter that coincides with the third speech parameter;

if the sample library comprises a second prestored speech parameter that coincides with the second speech parameter, executing control signalling instructed by the first sub signal; and/or, if the sample library comprises a third prestored speech parameter that coincides with the third speech parameter, executing control signalling instructed by the second sub signal.

In a further embodiment, prior to receiving the first speech signal issued by a user, the method further comprises:

storing the first prestored speech parameter and an identity of the first user to which the first prestored speech parameter corresponds into the sample library to establish a correspondence between the first user and the first prestored speech parameter.

In a further embodiment, a speech parameter comprises at least one of fundamental frequency information, sound pressure information and spectrum information of a speech signal.

In accordance with a second aspect, embodiments of the present disclosure provide a device for speech recognition comprising:

a receiving unit for receiving a first speech signal issued by a user;

a sampling unit for performing analog to digital conversion on the first speech signal from the receiving unit to generate a first digital signal after the analog to digital conversion;

an extraction unit for extracting a first speech parameter from the first digital signal in the sampling unit, the first speech parameter describing a speech feature of the first speech signal;

an execution unit for executing control signalling instructed by the first digital signal if the first speech parameter in the extraction unit coincides with a first prestored speech parameter in a sample library, the sample library prestoring prestored speech parameters of N users, N≥1.

In an embodiment, the device further comprises an identification unit for identifying the first speech signal as a stranger speech if the first speech parameter does not coincide with any of the prestored speech parameters of the N users in the sample library.

In another embodiment, the device further comprises a matching unit for determining that the user who issues the first speech signal is a first user corresponding to the first prestored speech parameter if a similarity between the first speech parameter and the first prestored speech parameter is greater than a threshold; and the execution unit is adapted to execute control signalling instructed by the first digital signal when the first user determined in the matching unit has speech permission.

In a further embodiment, the device further comprises a filtering unit for performing signal filtering on the first digital signal so as to obtain at least a first sub signal and a second sub signal from the filtered first digital signal; and the extraction unit is further adapted to extract from the first sub signal in the filtering unit a second speech parameter that describes a speech feature of the first sub signal, and extract from the second sub signal in the filtering unit a third speech parameter that describes a speech feature of the second sub signal;

the matching unit is further adapted to determine whether the sample library comprises a second prestored speech parameter that coincides with the second speech parameter, and/or a third prestored speech parameter that coincides with the third speech parameter; and the execution unit is further adapted to execute control signalling instructed by the first sub signal if the sample library comprises a second prestored speech parameter that coincides with the second speech parameter, and/or execute control signalling instructed by the second sub signal if the sample library comprises a third prestored speech parameter that coincides with the third speech parameter.

In yet another embodiment, the matching unit is further adapted to store the first prestored speech parameter and an identity of the first user to which the first prestored speech parameter corresponds into the sample library to establish a correspondence between the first user and the first prestored speech parameter.

The speech recognition solution according to embodiments of the present disclosure comprises performing analog to digital conversion of the acquired speech signal to generate a first digital signal after the analog to digital conversion; further extracting from the first digital signal a first speech parameter (e.g. including any one of fundamental frequency information, sound pressure information and spectrum information of the first speech signal) that describes a speech feature of the speech signal; if the first speech parameter coincides with a first prestored speech parameter in a sample library, that is, the first digital signal matches a first user corresponding to the first prestored speech parameter, a speech recognition device executing control signalling instructed by the first digital signal. In this way, when the speech recognition device acquires a digital signal that coincides with a prestored speech parameter of any user in the sample library, the subject issuing the speech signal to which the digital signal corresponds can be determined, thereby enhancing the accuracy of speech recognition. Furthermore, whether the control signalling instructed by the speech signal is executed or not is determined based on the subject issuing the speech signal, thus the security is also improved.

BRIEF DESCRIPTION OF THE DRAWINGS

To set forth the technical solutions in embodiments of the present disclosure more clearly, the drawings required for describing the embodiments are simply introduced below.

DETAILED DESCRIPTION

In the description below, for illustration rather than limitation, specific details such as specific system structure, interface and technology are proposed to enable the present disclosure to be understood thoroughly. However, those skilled in the art should appreciate that the present disclosure can also be carried out in other embodiments without these specific details. In other situations, detailed description of well-known devices, circuits and methods is omitted to prevent description of the present disclosure from being disturbed by unnecessary details.

Embodiment 1

Figure 1:
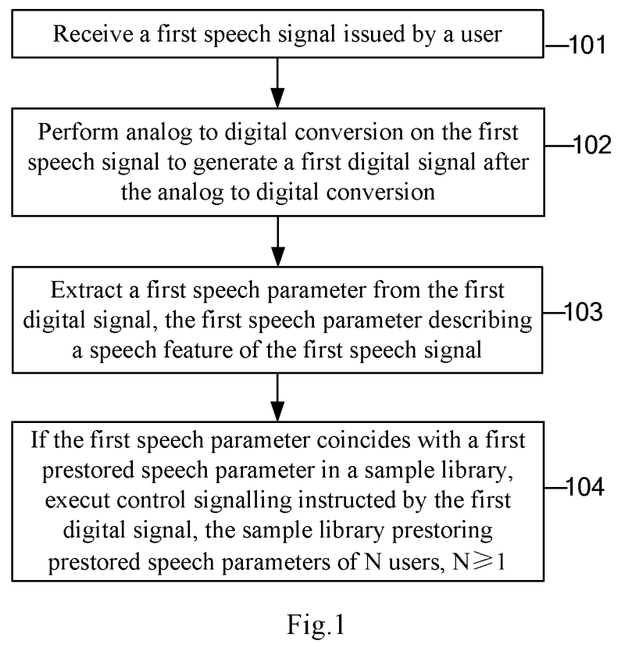
FIG. 1 is a flow chart of a first example speech recognition method according to embodiments of the present disclosure.

FIG. 1 illustrates a first example speech recognition method according to embodiments of the present disclosure. The speech recognition method comprises:

101 receiving a first speech signal issued by a user;

102 performing analog to digital conversion on the first speech signal to generate a first digital signal after the analog to digital conversion;

103 extracting a first speech parameter from the first digital signal, the first speech parameter describing a speech feature of the first speech signal. Alternatively, the first speech parameter at least includes any of fundamental frequency information, sound pressure information and spectrum information of the first speech signal.

104 If the first speech parameter coincides with a first prestored speech parameter in the sample library, a speech recognition device executes control signalling instructed by the first digital signal. The sample library prestores prestored speech parameters of N users, N≥1.

In accordance with embodiments of the present disclosure, the speech recognition method can be executed by a speech recognition device (such as a user device having speech recognition function, e.g. a mobile phone, a tablet computer, etc). In step 101, the speech recognition device can receive a first speech signal issued by a user to the speech recognition device. The first speech signal may specifically be control signalling for the speech recognition device, for example "unlock", "photograph", etc, or the control signalling can also require specific contents in the first speech signal to be literally recorded.

Certainly, the speech recognition device can be equipped with a sound collecting device such as mouthpiece or microphone for the convenience of receiving the first speech signal issued by a user.

After receiving/acquiring the first speech signal in step 101, the speech recognition device can perform in step 102 analog to digital conversion on the first speech signal via an analog to digital conversion device so as to convert the first speech signal present in a form of analog signal into a first digital signal.

In step 103, the speech recognition device extracts a first speech parameter from the first digital signal generated/acquired in step 102. The first speech parameter describes a speech feature of the first speech signal. The speech feature includes fundamental frequency, sound pressure or spectrum of the speech signal. The first speech parameter at least includes any of fundamental frequency information, sound pressure information and spectrum information of the first speech signal.

The fundamental frequency information is the frequency of the fundamental note, which decides the pitch of the whole note. It is possible to design a specialized program or algorithm to extract and quantify the fundamental frequency information in the first digital signal using software such as MatLab or specific chips. In accordance with embodiments of the present disclosure, the fundamental frequency information may refer to fundamental frequency information generated when the first speech signal is issued by one user. Alternatively, the fundamental frequency information may also refer to fundamental frequency information generated when the first speech signal is issued by at least two users simultaneously.

The sound pressure information refers to change in atmospheric pressure resulting from disturbance by sound waves produced by a user, i.e. residual pressure of the atmospheric pressure. It is equivalent to pressure change resulting from superposition of a sound wave disturbance on the atmospheric pressure.

The spectrum information refers to a distribution curve of the frequencies of a speech signal, wherein a complicated oscillation can be decomposed into harmonic oscillations with different amplitudes and different frequencies. The graph of the amplitudes of these harmonic oscillations which are arranged in terms of the frequencies is called spectrum information.

Similarly, the sound pressure information and the spectrum information can both be obtained by extraction and quantification from the first digital signal via specific chips.

The speech recognition device may be provided with a sample library which comprises prestored speech parameters of N users. That is to say, the sample library establishes correspondences between N users and their respective prestored speech parameters. Therefore, after extracting/acquiring the first speech parameter in step 103, the speech recognition device can compare in step 104 the first speech parameter with the prestored speech parameters of N users in the sample library. If the first speech parameter coincides with the first prestored speech parameter in the sample library, that is, the first speech signal to which the first speech parameter corresponds matches the first user to which the first prestored speech parameter corresponds, the speech recognition device can execute control signalling instructed by the first digital signal. That is to say, the speech recognition device can recognize a speech signal issued by a specific user and execute the corresponding control signalling, e.g. literally recording the specific contents expressed by the speech signal.

In accordance with embodiments of the present disclosure, the speech recognition device can calculate a similarity between the first speech parameter and the first prestored speech parameter. For example, at least one of a first similarity between the first fundamental frequency information in the first speech parameter and the fundamental frequency information in the first prestored speech parameter, a second similarity between the sound pressure information in the first speech parameter and the sound pressure information in the first prestored speech parameter, and a third similarity between the spectrum information in the first speech parameter and the spectrum information in the first prestored speech parameter is calculated. When at least one of the first similarity, the second similarity and the third similarity satisfies a corresponding threshold, it can be determined that the first speech parameter coincides with the first prestored speech parameter in the sample library.

Further, after determining that the first speech signal to which the first speech parameter corresponds matches the first user, it can be further determined whether the first user has speech permission to control the speech recognition device using the speech. For example, although the sample library stores the first prestored speech parameter, the first user does not have the speech permission. At that time, the speech recognition device would not execute the control signalling instructed by the first digital signal. Alternatively, when the user does not have the speech permission, warning information, etc can be issued. In this way, the security of the speech recognition device can be enhanced so as to prevent users who do not have the speech permission from operating the speech recognition device arbitrarily.

Furthermore, if the first speech parameter obtained in step 103 does not coincide with any of the prestored speech parameters of the N users in the sample library, the speech recognition device can identify the first speech signal as a stranger speech. Further, the speech recognition device can further record the stranger speech so as to facilitate a user whose speech parameter is prestored (e.g. authorized users) to query the use state of the speech device.

In an example, when the first speech signal in step 101 is generated by multiple users producing sound at different times, the speech recognition method according to embodiments of the present disclosure is still applicable. Correspondingly, the speech recognition device can execute steps 101 to 104 repeatedly to extract, e.g. periodically or as instructed by the user, the speech parameters of the first speech signal at different moments, e.g. a speech parameter 1 at a first moment and a speech parameter 2 at a second moment. The speech recognition device can further compare the speech parameter 1 with the prestored speech parameters of the N users in the sample library and compare the speech parameter 2 with the prestored speech parameters of the N users in the sample library, respectively, thereby finally determining whether the sample library contains a user 1 corresponding to the speech parameter 1 and a user 2 corresponding to the speech parameter 2. In this way, the speech recognition device can recognize a plurality of speech signals of multiple users and further execute control signallings to which the plurality of speech signals of multiple users correspond, respectively.

Embodiments of the present disclosure provide a speech recognition method. The speech recognition method comprises performing analog to digital conversion on the acquired speech signal to generate a first digital signal after the analog to digital conversion; further extracting a first speech parameter (e.g. including any one of fundamental frequency information, sound pressure information and spectrum information of the first speech signal) from the first digital signal; if the first speech parameter coincides with a first prestored speech parameter in the sample library, that is, the first digital signal matches a corresponding first user, the speech recognition device executing control signalling instructed by the first digital signal. In this way, when the speech recognition device acquires a digital signal that coincides with a prestored speech parameter of a user in the sample library, the subject issuing the speech signal to which the digital signal corresponds can be determined, thereby enhancing the accuracy of speech recognition.

Embodiment 2

Figure 2:
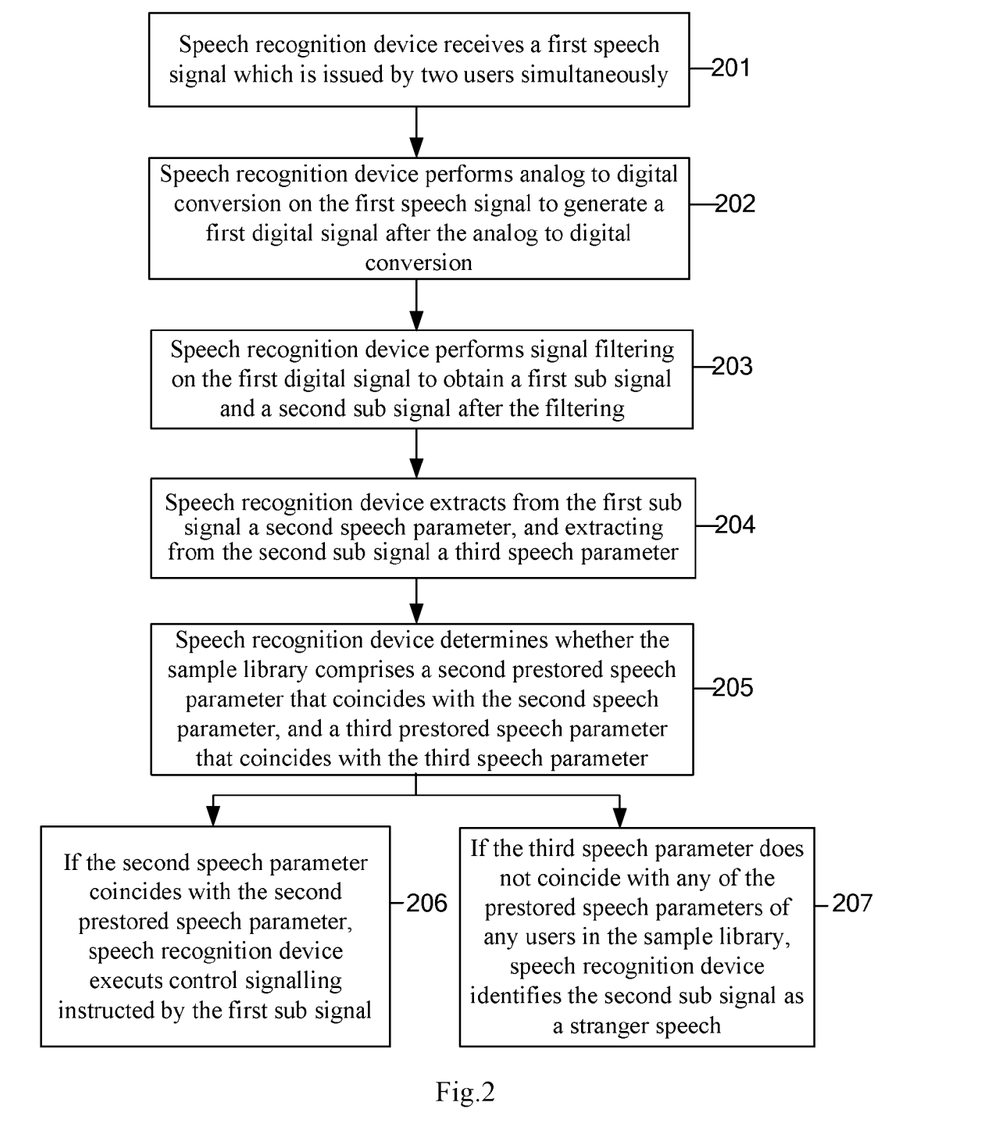
FIG. 2 is a flow chart of a second example speech recognition method according to embodiments of the present disclosure.

FIG. 2 illustrates a second example speech recognition method according to embodiments of the present disclosure. When multiple users issue speech signals to the speech recognition device simultaneously, the method according to embodiments of the present disclosure can recognize the speech signal issued by a specific user to improve the accuracy of speech recognition.

As shown in FIG. 2, for example, when two users issue a first speech signal to the speech recognition device simultaneously, the method comprises:

201 the speech recognition device receiving the first speech signal which is issued by two users simultaneously;

202 the speech recognition device performing analog to digital conversion on the first speech signal to generate a first digital signal after the analog to digital conversion;

203 the speech recognition device performing signal filtering on the first digital signal to obtain a first sub signal and a second sub signal after the filtering;

204 the speech recognition device extracting from the first sub signal a second speech parameter that describes a speech feature of the first sub signal, and extracting from the second sub signal a third speech parameter that describes a speech feature of the second sub signal;

205 the speech recognition device determining whether the sample library comprises a second prestored speech parameter that coincides with the second speech parameter, and a third prestored speech parameter that coincides with the third speech parameter;

206 if the second speech parameter coincides with the second prestored speech parameter, the speech recognition executing control signalling instructed by the first sub signal;

207 if the third speech parameter does not coincide with any of the prestored speech parameters of any users in the sample library, the speech recognition device identifying the second sub signal as a stranger speech.

In step 201, similar to step 101, the speech recognition device can receive the first speech signal via an element such as microphone. The difference is that the first speech signal is issued by two users simultaneously. That is to say, the first speech signal is a speech signal formed by superposing two sound waves generated by user A and user B who produce sound simultaneously.

Similarly, the first speech signal can specifically be control signalling for the speech recognition device, e.g. "unlock", "photograph", etc, or the control signalling can also require specific contents in the first speech signal to be literally recorded.

In step 202, similar to step 102, if the speech recognition device cannot recognize a continuously changing analog signal, while the first speech signal is present in a form of analog signal, the speech recognition device needs to perform analog to digital conversion on the first speech signal to generate a first digital signal after the analog to digital conversion.

In step 203, after the speech recognition device has acquired the first digital signal from step 202, since the first digital signal is determined to comprise speech signals issued by more than one user, e.g. user A and user B, it is required to perform signal filtering on the first digital signal to obtain filtered sub signals, e.g. a first sub signal and a second sub signal, corresponding to different users. The first sub signal may be a signal in the first digital signal which corresponds to user A, and the second sub signal is a signal in the first digital signal which corresponds to user B.

In accordance with embodiments of the present disclosure, the speech recognition device can extract the fundamental frequency information comprised in the first digital signal. When it is determined that the first digital signal comprises more than one fundamental frequency information, it can be determined that said speech signal is issued by more than one user simultaneously. In an example, the first digital signal comprises fundamental frequency information 1 and fundamental frequency information 2, and then the speech recognition device can separate the first sub signal corresponding to the fundamental frequency information 1 from the first digital signal and separate the second sub signal corresponding to the fundamental frequency information 2 from the first digital signal by performing signal filtering on the first digital signal. In this way, the filtered first sub signal and second sub signal correspond to the two users who issue the first speech signal in step 201, respectively.

Step 204 is similar to step 103. The difference is that the first speech parameter at that time comprises both the second speech parameter and the third speech parameter. Therefore, the speech recognition device extracts the second speech parameter from the first sub signal and extracts the third speech parameter from the second sub signal. Likewise, the second speech parameter at least includes any one of fundamental frequency information, sound pressure information and spectrum information of the first sub signal, while the third speech parameter at least includes any one of fundamental frequency information, sound pressure information and spectrum information of the second sub signal.

Correspondences between N users and their respective prestored speech parameters are established in the sample library of the speech recognition device. Therefore, the speech recognition device, after acquiring the second speech parameter and the third speech parameter in step 204, can determine in step 205 whether the sample library comprises a second prestored speech parameter that coincides with the second speech parameter and a third prestored speech parameter that coincides with the third speech parameter, respectively. Since the second prestored speech parameter and the third prestored speech parameter correspond to certain users, respectively, the speech recognition device can recognize the specific users who issue the first speech signal in step 201 by determining the second prestored speech parameter and the third prestored speech parameter.

In accordance with embodiments of the present disclosure, if the second speech parameter coincides with the second prestored speech parameter in the sample library, it indicates that the subject to which the second speech parameter corresponds is the second user, i.e. user A in step 201, to which the second prestored speech parameter corresponds. If the third speech parameter does not coincide with any of the prestored speech parameters of users in the sample library, it indicates that the speech parameter of the subject (i.e. user B) to which the third speech parameter corresponds is not prestored in the sample library.

In step 206, if the second speech parameter coincides with the second prestored speech parameter, that is, the second speech parameter in the first speech signal matches the second user, the speech recognition device can execute control signalling instructed by the first sub signal. That is to say, the speech recognition device can recognize a specific user from the speech signals of multiple users and execute corresponding control signalling according to the speech signal issued by the specific user, e.g. literally recording the specific contents expressed by the speech signal, etc.

Certainly, as stated in step 104, the speech recognition device can further determine whether the second user has speech permission to further execute corresponding control signalling.

In step 207, if the third speech parameter does not coincide with any of the speech parameters prestored in the sample library for any users, the speech recognition device identifies the second sub signal as a stranger speech. In an example, the speech recognition device can further record the speech identified as stranger speech so as to facilitate a user whose speech parameter is prestored (e.g. authorized users) to query the use state of the speech device.

Alternatively, if the third speech parameter does not coincide with any of the speech parameters prestored in the sample library for any users, the speech recognition device can further record the speech parameter of the second sub signal and an identity of user B corresponding to the speech parameter of the second sub signal, and store them into the sample library, thereby establishing a correspondence between the user B and the speech parameter of the second sub signal. In this way, when the user B issues a speech signal to the speech recognition device again, the speech recognition device can extract the speech parameter of the speech signal and match it with the speech parameter of the second sub signal in the sample library, thereby recognizing that it is a speech signal issued by the user B.

Embodiments of the present disclosure provide a speech recognition method. The speech recognition method comprises performing analog to digital conversion on the acquired speech signal to generate a first digital signal after the analog to digital conversion; obtaining different sub signals from the first digital signal; extracting speech parameters (e.g. including any one of fundamental frequency information, sound pressure information and spectrum information of the sub signals) from the respective sub signals; if the speech parameters of the sub signals coincide with the prestored speech parameters in the sample library, i.e. the sub signals match corresponding users, the speech recognition device executing control signallings instructed by the sub signals. In this way, the speech recognition device can determine the subjects issuing the speech signals to which the multiple sub signals correspond when multiple users issue speech signals simultaneously, thereby enhancing the accuracy of speech recognition.

Embodiment 3

Figure 3:
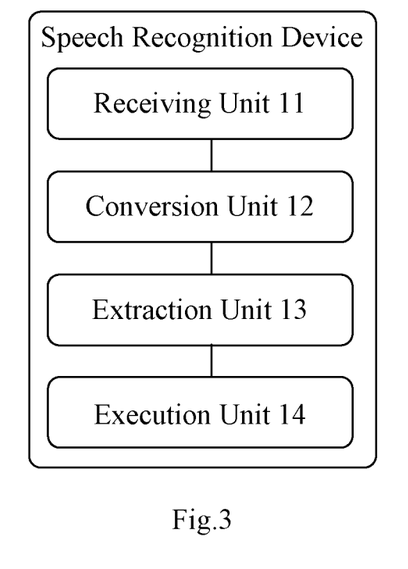
FIG. 3 is a structural schematic diagram of a first example speech recognition device according to embodiments of the present disclosure.

FIG. 3 illustrates a speech recognition device according to embodiments of the present disclosure. As shown in FIG. 3, the speech recognition device comprises:

a receiving unit 11 for receiving a first speech signal issued by a user;

a conversion unit 12 for performing analog to digital conversion on the first speech signal from the receiving unit 11 to generate a first digital signal after the analog to digital conversion;

an extraction unit 13 for extracting a first speech parameter from the first digital signal in the conversion unit 12, the first speech parameter describing a speech feature of the first speech signal and alternatively comprising at least one of fundamental frequency information, sound pressure information and spectrum information of the first speech signal;

an execution unit 14 for executing control signalling instructed by the first digital signal if the first speech parameter in the extraction unit 13 coincides with a first prestored speech parameter in a sample library, the sample library prestoring prestored speech parameters of N users, $N \geq 1$.

Figure 4:
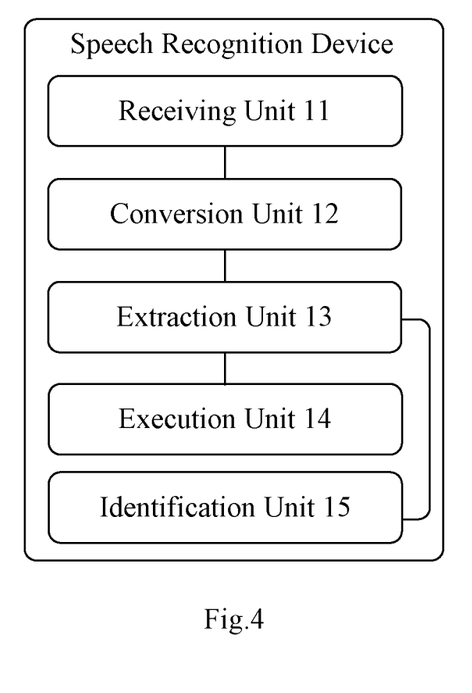
FIG. 4 is a structural schematic diagram of a second example speech recognition device according to embodiments of the present disclosure.

Further, as shown in FIG. 4, the device further comprises an identification unit 15 for identifying the first speech signal as a stranger speech if the first speech parameter in the extraction unit 13 does not coincide with any of the prestored speech parameters of the N users in the sample library.

Figure 5:
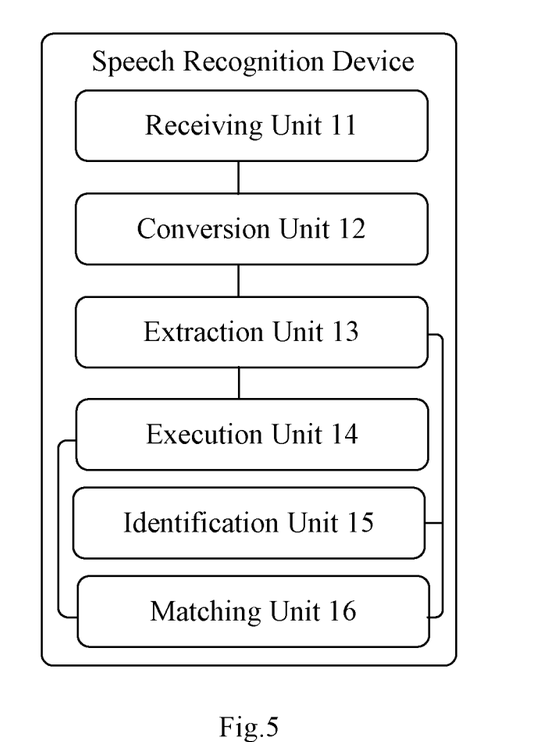
FIG. 5 is a structural schematic diagram of a third example speech recognition device according to embodiments of the present disclosure.

Further, as shown in FIG. 5, the device further comprises a matching unit 16 for determining that the user who issues the first speech signal is a first user corresponding to the first prestored speech parameter if a similarity between the first speech parameter and the first prestored speech parameter is greater than a threshold.

The execution unit 14 is used for executing control signalling instructed by the first digital signal if the first user in the matching unit 16 has speech permission.

Figure 6:
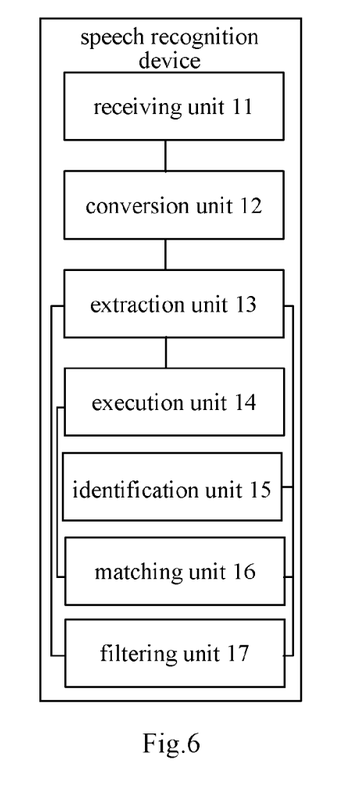
FIG. 6 is a structural schematic diagram of a fourth example speech recognition device according to embodiments of the present disclosure.

Further, as shown in FIG. 6, the device further comprises a filtering unit 17 for performing signal filtering on the first digital signal such that the filtered first digital signal at least comprises a first sub signal and a second sub signal.

The extraction unit 13 extracts from the first sub signal in the filtering unit 17 a second speech parameter that describes a speech feature of the first sub signal, and extracts from the second sub signal in the filtering signal 17 a third speech parameter that describes a speech feature of the second sub signal.

The matching unit 16 determines whether the sample library comprises a second prestored speech parameter that coincides with the second speech parameter in the extraction unit 13, and/or a third prestored speech parameter that coincides with the third speech parameter in the extraction unit 13.

The execution unit 14 executes control signalling instructed by the first sub signal in the event that the sample library comprises the second prestored speech parameter that coincides with the second speech parameter; and/or executes control signalling instructed by the second sub signal in the event that the sample library comprises the third prestored speech parameter that coincides with the third speech parameter.

In an example, the matching unit 16 further stores the first prestored speech parameter and an identity of the first user to which the first prestored speech parameter corresponds into the sample library so as to establish a correspondence between the first user and the first prestored speech parameter.

Embodiments of the present disclosure provide a speech recognition device. The speech recognition device performs analog to digital conversion on the acquired speech signal to generate a first digital signal after the analog to digital conversion, and further extracts a first speech parameter (e.g. including any one of fundamental frequency information, sound pressure information and spectrum information of the first speech signal) from the first digital signal. If the first speech parameter coincides with the first prestored speech parameter in the sample library, that is, the first digital signal matches a first user, the speech recognition device executes control signalling instructed by the first digital signal. In this way, when the speech recognition device acquires a digital signal that coincides with the prestored speech parameter of a user in the sample library, the subject issuing the speech signal to which the digital signal corresponds can be determined, thereby enhancing the accuracy of speech recognition.

Embodiment 4

Figure 7:
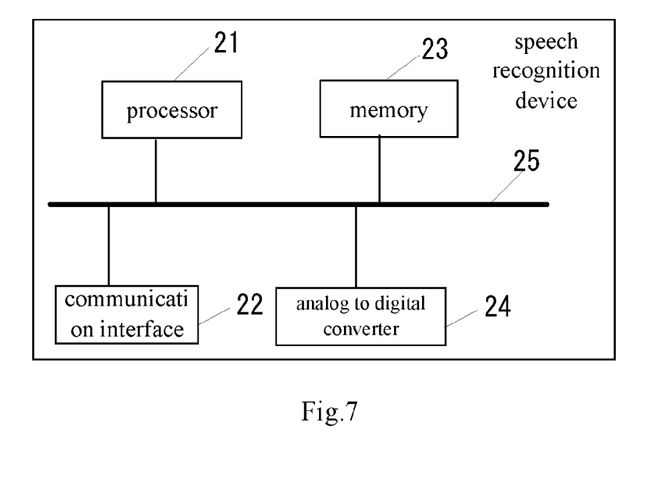
FIG. 7 is a hardware schematic diagram of the speech recognition device according to embodiments of the present disclosure.

FIG. 7 illustrates a hardware schematic diagram of the speech recognition device according to embodiments of the present disclosure. The speech recognition device can be used to carry out the above method implemented by respective embodiments of the present disclosure as illustrated in FIGS. 1 to 3. For the convenience of illustration, only the portions related to the embodiments of the present disclosure are illustrated. As regards other specific technical details, reference may be made to the respective embodiments of the present disclosure as illustrated in FIGS. 1 to 3.

As shown in FIG. 7, the speech recognition device comprises a processor 21, a communication interface 22, a memory 23, an analog to digital converter 24 and a bus 25.

The processor 21, the communication interface 22, the memory 23 and the analog to digital converter 24 may communicate via the bus 25.

The processor 21 is the control center of the speech recognition device. The processor 21 executes various functions of the speech recognition device and processes data by running or executing software programs and/or modules stored in the memory 23, and calling data stored in the memory 23.

The communication interface 22 can be implemented by an optical communication interface, an electrical communication interface, a wireless communication interface or any combination thereof. For example, the optical communication interface may be a small form-factor pluggable (SFP) transceiver, an enhanced small form-factor pluggable (SFP+) transceiver or 10 Gigabit small form-factor pluggable (XFP) transceiver. The electrical communication interface may be an Ethernet network interface controller (NIC). The wireless communication interface may be a wireless network interface controller (WNIC). The speech recognition device may comprise a plurality of communication interfaces 22.

The memory 23 can be used for storing software programs or data. The processor 21 executes various functional applications of the speech recognition device and processes data by running software programs or data stored in the memory 23.

The analog to digital converter 24, i.e. A/D converter (ADC), usually refers to a circuit that converts an analog signal to a digital signal, which can convert an analog quantity continuous in both time and amplitude into a digital signal discrete in both time and amplitude.

In embodiments of the present disclosure, the communication interface 22 receives a first speech signal issued by a user and sends it to the analog to digital converter 24. The analog to digital converter 24 performs analog to digital conversion on the first speech signal to generate a first digital signal after the analog to digital conversion and send it to the processor 21. The processor 21 extracts from the first digital signal a first speech parameter that describes a speech feature of the speech signal. In an example, the first speech parameter at least includes any one of fundamental frequency information, sound pressure information and spectrum information of the first speech signal. If the first speech parameter coincides with the first prestored speech parameter in the sample library, the processor 21 executes control signalling instructed by the first digital signal. The sample library prestores prestored speech parameters of N users, N≥1.

Further, the processor 21, after extracting the first speech parameter from the first digital signal, may further perform a step of identifying the first speech signal as a stranger speech if the first speech parameter does not coincide with any of the prestored speech parameters of the N users in the sample library within the memory 23.

In accordance with embodiments of the present disclosure, if the first speech parameter coincides with the first prestored speech parameter in the sample library within the memory 23, the processor 21 executes control signalling instructed by the first digital signal. For example, if a similarity between the first speech parameter and the first prestored speech parameter in the memory 23 is greater than a threshold, the processor 21 determines that the user who issues the first speech signal is a first user corresponding to the first prestored speech parameter. If the first user has speech permission, the processor 21 executes the control signalling instructed by the first digital signal.

Further, the processor 21 can extract the first speech parameter from the first digital signal in the following manner, i.e. the processor 21 performs signal filtering on the first digital signal such that the filtered first digital signal at least comprises a first sub signal and a second sub signal; further, the processor 21 extracts from the first sub signal a second speech parameter that describes a speech feature of the first sub signal, and extracts from the second sub signal a third speech parameter that describes a speech feature of the second sub signal; the processor 21 determines from the sample library of the memory 23 whether it comprises a second prestored speech parameter that coincides with the second speech parameter, and/or a third prestored speech parameter that coincides with the third speech parameter.

Furthermore, if the sample library comprises a second prestored speech parameter that coincides with the second speech parameter, the processor 21 executes control signalling instructed by the first sub signal; and/or, if the sample library comprises a third prestored speech parameter that coincides with the third speech parameter, the processor 21 executes control signalling instructed by the second sub signal.

Further, prior to receiving the first speech signal issued by a user and sending it to the analog to digital converter 24, the communication interface 22 sends the acquired first prestored speech parameter to the processor 21, and the processor 21 stores an identity of the first user and the first prestored speech parameter into the sample library in the memory 23 to establish a correspondence between the first user and the first speech parameter.

Embodiments of the present disclosure provide a speech recognition device. The speech recognition device comprises a processor, a communication interface, a memory and an analog to digital converter. The analog to digital converter performs analog to digital conversion on an acquired speech signal to generate a first digital signal after the analog to digital conversion. The processor is adapted to extract a first speech parameter (including any one of fundamental frequency information, sound pressure information and spectrum information of the first speech signal) from the first digital signal. If the first speech parameter coincides with the first prestored speech parameter in the sample library stored in the memory, that is, the first digital signal matches the first user to which the first prestored speech parameter corresponds, the processor can execute control signalling instructed by the first digital signal. In this way, when the speech recognition device acquires a digital signal that coincides with the prestored speech parameter of a user in the sample library, the subject issuing the speech signal to which the digital signal corresponds can be determined, thereby enhancing the accuracy of speech recognition.

In the description of the present specification, specific features, structures, materials or features can be combined in a suitable manner in any one or more embodiments or examples.

In addition, the terms "first", "second" are only used for descriptive purpose, and cannot be understood as indicating or implying relative importance or implicitly indicating the number of denoted technical features. Therefore, the features defined with "first", "second" may explicitly or implicitly comprise one or more features. In the description of the present disclosure, the wording "more" means two or more unless otherwise specified.

The above contents are only specific embodiments of the present disclosure, but the protection scope of the present disclosure is not so limited. The skilled persons in the art will easily conceive various variations or substitutions based on the technologies disclosed by the present disclosure. All of these variations or substitutions will fall within the scope of the present disclosure. Therefore, the protection scope of the present disclosure shall be limited by the protection scope of the claims.

The invention claimed is:

1. A method for speech recognition implemented by a speech recognition device comprising:
    receiving a first speech signal issued by multiple users;
    performing analog to digital conversion on the first speech signal to generate a first digital signal after the analog to digital conversion;
    extracting a first speech parameter from the first digital signal, the first speech parameter describing a speech feature of the first speech signal;
    if the first speech parameter coincides with a first prestored speech parameter in a sample library, executing control signaling instructed by the first digital signal, the sample library prestoring prestored speech parameters of N users, N≥1;
    wherein extracting the first speech parameter from the first digital signal comprises:
        performing signal filtering on the first digital signal so as to obtain at least a first sub signal corresponding to a first user and a second sub signal corresponding to a second user from the filtered first digital signal;
        extracting, from the first sub signal, a second speech parameter that describes a speech feature of the first sub signal, and extracting, from the second sub signal, a third speech parameter that describes a speech feature of the second sub signal;
        wherein the first speech parameter comprises the second speech parameter and the third speech parameter.

2. The method according to claim 1, after extracting the first speech parameter from the first digital signal, further comprising:
    if the first speech parameter does not coincide with any of the prestored speech parameters of the N users in the sample library, identifying the first speech signal as a stranger speech.

3. The method according to claim 1, wherein if the first speech parameter coincides with the first prestored speech parameter in the sample library, executing control signalling instructed by the first digital signal comprises:
    if a similarity between the first speech parameter and the first prestored speech parameter is greater than a threshold, determining that the user who issues the first speech signal is a user corresponding to the first prestored speech parameter; and
    if the user corresponding to the first prestored speech parameter has speech permission, executing control signalling instructed by the first digital signal.

4. The method according to claim 1, wherein if the first speech parameter coincides with the first prestored speech parameter in the sample library, executing control signalling instructed by the first digital signal comprises:
    determining whether the sample library comprises a second prestored speech parameter that coincides with the second speech parameter, and/or a third prestored speech parameter that coincides with the third speech parameter;
    if the sample library comprises a second prestored speech parameter that coincides with the second speech parameter, executing control signalling instructed by the first sub signal; and/or, if the sample library comprises a third prestored speech parameter that coincides with the third speech parameter, executing control signalling instructed by the second sub signal.

5. The method according to claim 1, prior to receiving the first speech signal issued by multiple users, further comprising:
    storing the first prestored speech parameter and an identity of the user to which the first prestored speech parameter corresponds into the sample library to establish a correspondence between the user and the first prestored speech parameter.

6. The method according to claim 1, wherein a speech parameter comprises at least one of fundamental frequency information, sound pressure information and spectrum information of a speech signal.

7. A device for speech recognition comprising:
    a receiver being adapted to receive a first speech signal issued by multiple users;
    a converter being adapted to perform analog to digital conversion on the first speech signal from the receiving unit to generate a first digital signal after the analog to digital conversion;
    an extractor being adapted to extract a first speech parameter from the first digital signal, the first speech parameter describing a speech feature of the first speech signal;
    an execution circuit being adapted to execute control signaling instructed by the first digital signal if the first speech parameter coincides with a first prestored speech parameter in a sample library, the sample library prestoring prestored speech parameters of N users, N≥1, the device further comprising:
a filter being adapted to perform signal filtering on the first digital signal so as to obtain at least a first sub signal corresponding to a first user and a second sub signal corresponding to a second user from the filtered first digital signal;

wherein the extractor is further adapted to extract, from the first sub signal, a second speech parameter that describes a speech feature of the first sub signal, and extract, from the second sub signal, a third speech parameter that describes a speech feature of the second sub signal, wherein the first speech parameter comprises the second speech parameter and the third speech parameter.

8. The device according to claim 7, wherein the device further comprises an identification unit implemented by a processor for identifying the first speech signal as a stranger speech if the first speech parameter does not coincide with any of the prestored speech parameters of the N users in the sample library.

9. The device according to claim 7, wherein the device further comprises a matching unit implemented by a processor for determining that the user who issues the first speech signal is a first user corresponding to the first prestored speech parameter if a similarity between the first speech parameter and the first prestored speech parameter is greater than a threshold; and the execution circuit is adapted to execute control signaling instructed by the first digital signal when the first user has speech permission.

10. The device according to claim 7, wherein the device further comprises;
a matching unit implemented by a processor being adapted to determine whether the sample library comprises a second prestored speech parameter that coincides with the second speech parameter, and/or a third prestored speech parameter that coincides with the third speech parameter; and wherein the execution circuit is further adapted to execute control signaling instructed by the first sub signal in the event that the sample library comprises a second prestored speech parameter that coincides with the second speech parameter, and/or execute control signaling instructed by the second sub signal in the event that the sample library comprises a third prestored speech parameter that coincides with the third speech parameter.

11. The device according to claim 7, wherein the device further comprises a matching unit implemented by a processor being adapted to store the first prestored speech parameter and an identity of the user to which the first prestored speech parameter corresponds into the sample library to establish a correspondence between the user and the first prestored speech parameter.

12. The device according to claim 7, wherein a speech parameter comprises at least one of fundamental frequency information, sound pressure information and spectrum information of a speech signal.

13. A device for speech recognition comprising:
a communication interface for receiving a first speech signal issued by multiple users;
an analog to digital converter for performing analog to digital conversion on the first speech signal from the communication interface to generate a first digital signal after the analog to digital conversion;
a memory for storing a sample library which prestores prestored speech parameters of N users, N≥1; and
a processor for extracting a first speech parameter from the first digital signal, the first speech parameter describing a speech feature of the first speech signal; and executing control signaling instructed by the first digital signal if the first speech parameter coincides with a first prestored speech parameter in the sample library;

the device further comprising:
a filter being adapted to perform signal filtering on the first digital signal so as to obtain at least a first sub signal corresponding to a first user and a second sub signal corresponding to a second user from the filtered first digital signal;
wherein the processor is further adapted to extract, from the first sub signal, a second speech parameter that describes a speech feature of the first sub signal, and extract, from the second sub signal, a third speech parameter that describes a speech feature of the second sub signal, wherein the first speech parameter comprises the second speech parameter and the third speech parameter.

14. The method according to claim 1, further comprises extracting fundamental frequency information comprised in the first digital signal and determining that that the first speech signal is issued by more than one user simultaneously if the first digital signal comprises more than one fundamental frequencies.

15. The method according to claim 14, wherein performing signal filtering on the first digital signal so as to obtain at least a first sub signal corresponding to a first user and a second sub signal corresponding to a second user from the filtered first digital signal comprises: separating the first sub signal corresponding to a first fundamental frequency of said more than fundamental frequencies from the first digital signal and separate the second sub signal corresponding to a second fundamental frequency of said more than fundamental frequencies from the first digital signal.

* * * * *